United States Patent
Wymore (10) Patent No.: US 10,821,874 B2
(45) Date of Patent: *Nov. 3, 2020

(54) ROTATABLE LIGHT BAR FOR MOTOR VEHICLE SPORT BARS

(71) Applicant: Iddea California, LLC, Brea, CA (US)

(72) Inventor: Timothy J. Wymore, Yorba Linda, CA (US)

(73) Assignee: NAADE, Inc., Laredo, TX (US)

( * ) Notice: Subject to any disclaimer, the term of this patent is extended or adjusted under 35 U.S.C. 154(b) by 91 days.

This patent is subject to a terminal disclaimer.

(21) Appl. No.: 16/174,720

(22) Filed: Oct. 30, 2018

(65) Prior Publication Data

US 2019/0061599 A1    Feb. 28, 2019

Related U.S. Application Data

(63) Continuation of application No. 15/225,977, filed on Aug. 2, 2016, now Pat. No. 10,189,395.

(51) Int. Cl.
| | |
|---|---|
| *B60Q 1/00* | (2006.01) |
| *B60Q 1/04* | (2006.01) |
| *B60Q 1/05* | (2006.01) |
| *B60Q 1/18* | (2006.01) |

(Continued)

(52) U.S. Cl.
CPC ......... *B60Q 1/0005* (2013.01); *B60Q 1/0041* (2013.01); *B60Q 1/0076* (2013.01); *B60Q 1/02* (2013.01); *B60Q 1/0483* (2013.01); *B60Q 1/05* (2013.01); *B60Q 1/18* (2013.01); *B60Q 1/0035* (2013.01); *B60Q 1/2611* (2013.01)

(58) Field of Classification Search
None
See application file for complete search history.

(56) References Cited

U.S. PATENT DOCUMENTS

| | | |
|---|---|---|
| D244,268 S | 5/1977 | Hinch |
| 4,152,020 A | 5/1979 | Brown et al. |
| D253,170 S | 10/1979 | Ramirez |

(Continued)

OTHER PUBLICATIONS

Addictive Desert Designs ADD Offroad, web page <https://www.addictivedesertdesigns.com/ford-f150-raptor-chase-rack-C115802800103>, Sep. 27, 2018, 8 pages.

(Continued)

*Primary Examiner* — Sharon E Payne
(74) *Attorney, Agent, or Firm* — Stetina Brunda Garred and Brucker (57) ABSTRACT

A light bar for a motor vehicle has a plurality of lights mounted to an elongated support member is rotatably connected to opposing end walls of a rectangular frame. An offset cam is connected to the support member and moved by an actuating mechanism between a first and second position which cause the support member and lights to rotate about an axis to corresponding first and second positions. When the support frame and lights are in a first position they are shielded by and substantially enclosed by the sides and ends of the rectangular frame, and when in a second position the lights extend above and generally parallel to the rectangular frame to shine above and forward of the rectangular frame. A power switch energizes the actuating mechanism to move the lights and support member between the first and second positions.

18 Claims, 4 Drawing Sheets

(51) Int. Cl.
*B60Q 1/02* (2006.01)
*B60Q 1/26* (2006.01)

(56) References Cited

U.S. PATENT DOCUMENTS

| | | |
|---|---|---|
| 4,211,448 A | 7/1980 | Weston |
| 4,267,948 A | 5/1981 | Lewis |
| 4,278,175 A | 7/1981 | Jackson |
| 4,473,868 A | 9/1984 | Moore |
| 4,569,002 A * | 2/1986 | English ............... B60Q 1/0005 362/543 |
| 4,583,152 A | 4/1986 | Kawai et al. |
| 4,659,131 A | 4/1987 | Flournoy |
| 4,707,014 A | 11/1987 | Rich |
| D295,084 S | 4/1988 | Weber |
| 4,787,665 A | 11/1988 | Rich |
| 4,854,628 A | 8/1989 | Halberg |
| D305,111 S | 12/1989 | Zagner |
| D306,848 S | 3/1990 | Macor |
| 5,002,324 A | 3/1991 | Griffin |
| D316,391 S | 4/1991 | Lund |
| D318,447 S | 7/1991 | Haugen et al. |
| 5,037,152 A | 8/1991 | Hendricks |
| 5,061,000 A | 10/1991 | Haugen et al. |
| 5,143,415 A | 9/1992 | Boudah |
| 5,152,570 A | 10/1992 | Hood |
| 5,192,107 A | 3/1993 | Smith |
| 5,303,858 A | 4/1994 | Price |
| 5,316,190 A | 5/1994 | Bullock |
| D360,614 S | 7/1995 | Alcocer |
| D363,460 S | 10/1995 | Marshall |
| 5,476,301 A | 12/1995 | Berkich |
| 5,492,259 A | 2/1996 | Tippets |
| D367,843 S | 3/1996 | Tayar |
| 5,560,666 A | 10/1996 | Vieira et al. |
| 5,692,791 A | 12/1997 | Sulzer |
| D394,639 S | 5/1998 | Carter |
| 5,752,734 A | 5/1998 | Ward et al. |
| 5,806,905 A | 9/1998 | Moore |
| D399,476 S | 10/1998 | Duncan |
| 5,836,635 A | 11/1998 | Dorman |
| D436,915 S | 1/2001 | Burger |
| D444,446 S | 7/2001 | Carter |
| 6,367,673 B1 | 4/2002 | Smith et al. |
| 6,394,524 B1 | 5/2002 | Morse |
| D463,358 S | 9/2002 | Thomas |
| D467,862 S | 12/2002 | Jenkins |
| 6,513,849 B2 | 2/2003 | Carter |
| 6,520,723 B2 | 2/2003 | Christensen |
| D493,414 S | 7/2004 | Condos |
| D494,921 S | 8/2004 | Taylor |
| 6,883,848 B1 | 4/2005 | Iverson et al. |
| 6,983,968 B2 | 1/2006 | Brauer et al. |
| 6,983,977 B1 | 1/2006 | Kozak et al. |
| D515,495 S | 2/2006 | Storer |
| D528,964 S | 9/2006 | Storer et al. |
| D528,968 S | 9/2006 | Storer et al. |
| 10,189,395 B2 * | 1/2019 | Wymore ............... B60Q 1/0483 |
| 2015/0217679 A1 | 8/2015 | Paine et al. |

OTHER PUBLICATIONS

ADD Addictive Desert Designs, 2017—Current Ford Raptor Race Series R Chase Rack Installation Instructions, Sep. 27, 2018, 1 page.
Addictive Desert Designs, ford-f150-chase-rack.jpg <https://www.addictivedesertdesigns.com/images/products/secondary/c115802800103/c115802800103-4/ford-f150-chase-rack.jpg>, Sep. 27, 2018, 1 page.
Addictive Desert Designs, 2017-ford-raptor-chase-racktg <https://www.addictivedesertdesigns.com/images/products/secondary/c115802800103/c115802800103-1/2017-ford-raptor-chase-rack.jpg>, Sep. 27, 2018, 1 page.
Patent Cooperation Treaty, International Search Report and Written Opinion for International Application No. PCT/US2017/043134, dated Oct. 2, 2017, 10 pages.

* cited by examiner

ROTATABLE LIGHT BAR FOR MOTOR VEHICLE SPORT BARS

The present application is a continuation patent application of U.S. patent application Ser. No. 15/225,977 filed on Aug. 2, 2016, the entire contents of which are incorporated herein by reference.

BACKGROUND

The present invention relates generally to lights for a sports bar used on motor vehicles, typically trucks.

In order to enhance night visibility, supplemental lights may be mounted to a sports bar located to position the lights above the cab of a truck with the lights located and orientated to supplement the vehicle lighting. The sports bar typically mounts to the cab of a vehicle at the front or rear of the cab, or mounts to the upper edge of a truck bed box so that the sports bar is located at the roof of the vehicle, at a height above the head of the seated driver and seated passengers. A plurality of lights is mounted to the bar, with the lights shining forward and slightly downward to enhance visibility in front of the vehicle. When mounted to pickup trucks with beds, the light bar is typically located at or slightly above the rear of the cab with the lights shining forward, over the top of the cab.

These supplemental night lights are often used in off-road situations where rough terrain with undergrowth may extend over the vehicle's cab and hit the lights, or in wooded terrain where branches may scrape the vehicle's top and hit the lights. The projecting lights may be damaged by contact with such undergrowth or tree branches either during use at night or during the daytime when the vehicle passes below the limbs of such undergrowth or branches. Further, any rocks or debris reaching the height of the vehicle's top may damage the lights by cracking or even breaking the lens on the light. There is thus a need for a light bar with lights that are more resistant to damage from passing undergrowth and branches.

These supplemental lights extend generally perpendicular to the top of the vehicle's cab and may create wind turbulence and noise when the vehicle drives on roads. Both the noise and resulting increase in fuel usage from the wind resistance are undesirable. There is thus a need for a light bar with lights that reduce wind turbulence and noise.

BRIEF SUMMARY

A light bar for a motor vehicle has a plurality of lights mounted to an elongated support member is rotatably connected to opposing end walls of a rectangular frame. An offset cam is connected to the support member and moved by an actuating mechanism between a first and second position which cause the support member and lights to rotate about an axis to corresponding first and second positions. When the support frame and lights are in a first position they are shielded by and substantially enclosed by the sides and ends of the rectangular frame, and when in a second position the lights extend above and generally parallel to the rectangular frame to shine above and forward of the rectangular frame. A power switch energizes the actuating mechanism to move the lights and support member between the first and second positions.

In more detail, a light bar is provided having a support frame that may be mounted to a vehicle cab or a separate mounting structure to locate the support frame along the top of a vehicle's cab. The frame extends across a width of the vehicle's cab with an end frame at each opposing end of the support frame. An elongated support member extends between the end frames and is rotatably mounted to those end frames so as to rotate about a longitudinal axis extending between those end frames. A plurality of lights are mounted to the elongated support member and the support frame is configured to permit the lights to rotate between a first, retracted position where the lights are preferably pointing generally vertical and generally parallel to the vehicle cab, and a second, deployed position where the lights are preferably facing forward to supplement the vehicle lights during use.

A rotating mechanism rotates the elongated support member and attached lights between the first and second positions. The rotating mechanism preferably comprises a piston having a first end mounted to the support frame and a second end mounted to the elongated support member at a location offset from the longitudinal axis about which the elongated support member rotates, thus effectively forming an offset cam that rotates the elongated support member and lights to the second, deployed position as the piston extends, and rotating the elongated support member and lights to the first, retracted position as the piston retracts. In the first, retracted position the lights are advantageously vertically below the upper periphery of the support frame so the support frame preferably encloses the periphery of the lights and elongated support member to reduce wind resistance and noise and to permit the support frame to deflect branches and undergrowth from the lights. In the second, deployed position, the lights, or a substantial portion of the lights are preferably above the upper periphery of the support frame to provide additional light to the vehicle's driver.

The piston can be extended and retracted by various mechanisms, including a solenoid, electric motor and gear arrangement, electric compressor driving a pneumatic piston, hydraulically, or rotating a lever connected to the elongated support member. Each of these various mechanisms may drive the piston through the desired motion range of extension and retraction.

In more detail, there is advantageously provided a light bar and mounting system for a motor vehicle that includes a generally rectangular support frame having an elongated base with two opposing sidewalls joined to two opposing, first and second ends. The support frame has an open top and an open or closed bottom. A rotational axis extends between the first and second ends and an elongated support member extends along and rotates about that axis between a first, retracted position and a second, deployed position. A plurality of electrical lights are fastened to the elongated support member so as to point in the same direction and rotate with the elongated support member between the first and second positions. The plurality of lights in the first position point along a generally vertical axis during use and in the second position the lights point in a direction generally perpendicular to the first direction. An actuating mechanism has a piston connected to the elongated support member at a location offset from the rotational axis to form an offset cam. The actuating member is movable between a first, retracted cam position which rotates the elongated support member and lights to the first, retracted position, and a second, deployed cam position which rotates the elongated support member and lights to the second, deployed position. The system may further include a first and second mounting brackets, each having a first, upper end connected to a different one of the first end of the support frame, or optionally to one of the sides of the support frame. The mounting brackets each have a second, lower end with a mounting plate to connect to the vehicle during use.

In further variations, the first and second mounting brackets each comprise a single, tubular member. The first and second mounting brackets may also each include a first and second tube extending downward and angled apart from each other and extending downward a distance sufficient to locate a bottom of the support frame sidewalls at the top of a vehicle cab of a pickup truck when the mounting plates are connected to a box of the pickup truck. The sidewalls and lights may be configured so that when the lights are in the first, retracted position each of the lights is below an upper edge of at least one of the sidewalls. The elongated support member preferably has a C-shaped cross-section. The lights may be three inch, square lights, or seven inch, round lights. The actuating mechanism preferably includes a piston that is extendable and retractable to rotate the elongated support member, and may include a solenoid. The actuating mechanism is preferably electrically powered and actuated by a switch. The switch may be mounted on the support frame or a mounting bracket.

There is also provided a light bar and mounting system for a motor vehicle that includes a housing having two opposing sidewalls sized to extend across a substantial portion of the width of a motor vehicle where the housing has two opposing end walls each connected to both sidewalls at opposing ends of the sidewalls. The system also includes an elongated support member within the housing and rotatably connected to the end walls to rotate about a longitudinal axis through the end walls. A plurality of lights are connected to the elongated support member so as to emit light in the same direction during use. An offset cam is connected to the elongated support to rotate offset cam, the support member and the lights about the longitudinal between first and second positions. The first position has the lights facing generally horizontal during use and the second position having the lights generally perpendicular to the first position.

In further variations of this system, it may include an actuating mechanism connected to the housing. The mechanism may include a driving mechanism moving a piston that extends and retracts, the piston being connected to the offset cam to move the cam between the first and second positions. The system may also include a mounting bracket connecting at least one light to the elongated support member with the mounting bracket connected to the light at two locations to define a light rotational axis generally parallel to the longitudinal axis about which the light may rotate. A clamping mechanism restrains such rotation at a desired rotation. This system may also include first and second vehicle mounts each connected to a different end of at least one of the sidewalls or end walls and extending downward during use.

There is also provided light bar and mounting system may supplement a motor vehicle lighting system. This system includes a light bar connected to a motor vehicle having wheels so as to extend across a width of the vehicle. The light bar has an elongated support member mounted to rotate about a rotational axis extending along a length of the elongated support member and generally parallel to a roof of the motor vehicle. A plurality of lights are connected to the support member so as to rotate the same amount and direction as the support member rotates. At least one offset cam is connected to the support member so the cam and support member rotate together about the rotational axis between a first position in which the lights are generally parallel to the roof of the motor the vehicle and a second position in which the lights are generally perpendicular to the roof of the motor vehicle. A housing extends in an upward direction relative to the vehicle and encircling the support member. The support member is rotatably connected to the housing to rotate about the rotational axis. An actuating mechanism has one portion connected to the housing and another portion connected to the offset cam at a location offset from the rotational axis for rotating the cam about the rotational axis between the first and second positions.

In further variations, this system may include first and second vehicle mounts each connected to a different end of housing and the motor vehicle during. The system may also have at least one of the plurality of lights mounted to a U-shaped bracket connected to the elongated support member and rotatable about a light axis parallel to, but offset from, the rotational axis. This system may also include an actuating mechanism having a piston that may be extended and retracted, with a distal end of the piston connected to the offset cam.

BRIEF DESCRIPTION OF THE DRAWINGS

These and other advantages and features of the invention will be better appreciated in view of the following drawings and descriptions in which like numbers refer to like parts throughout, and in which.

DETAILED DESCRIPTION

Figure 1:
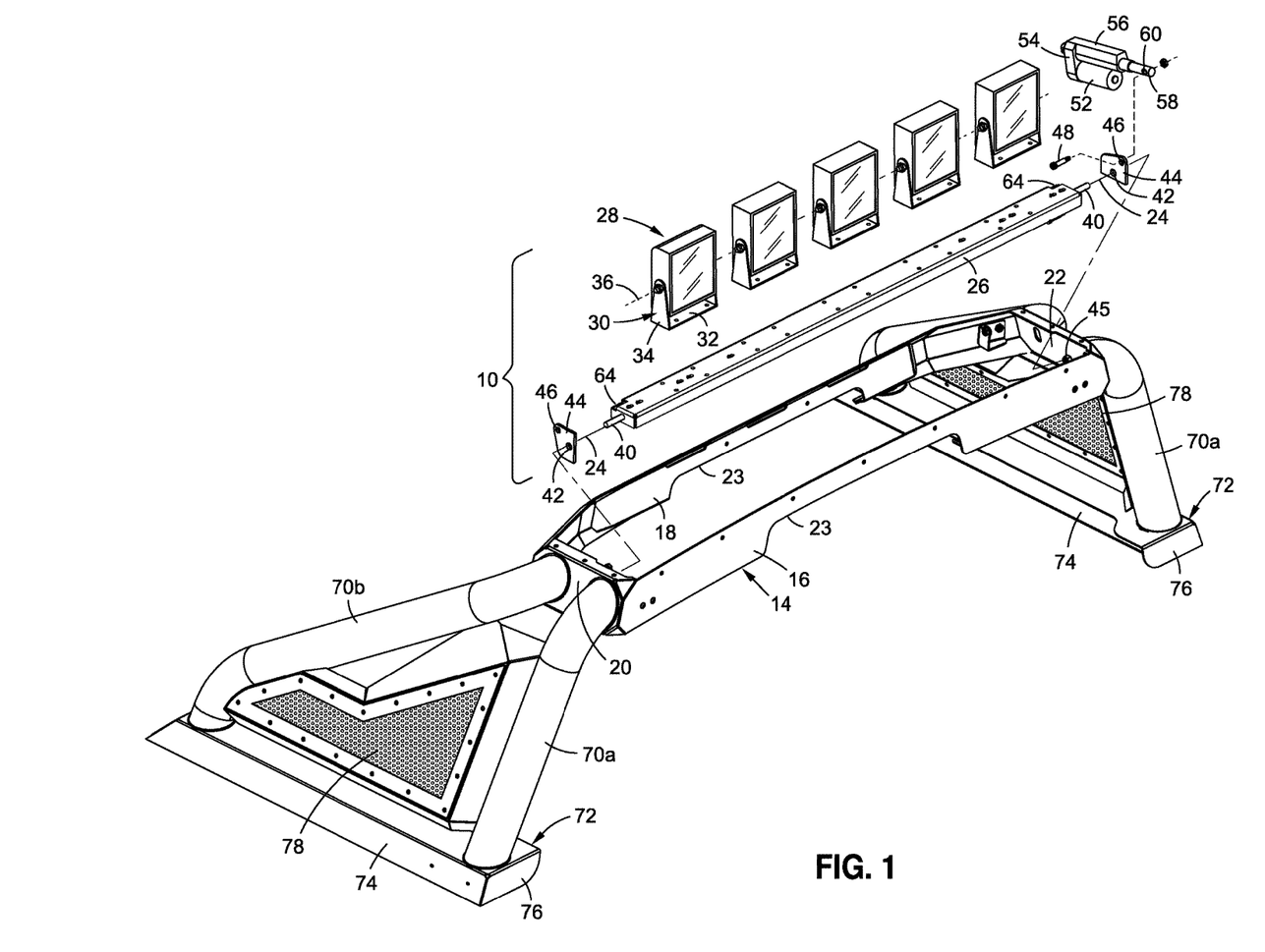
FIG. 1 is an exploded view of a rotatable light bar and a mounting frame for a motor vehicle.
Figure 2:
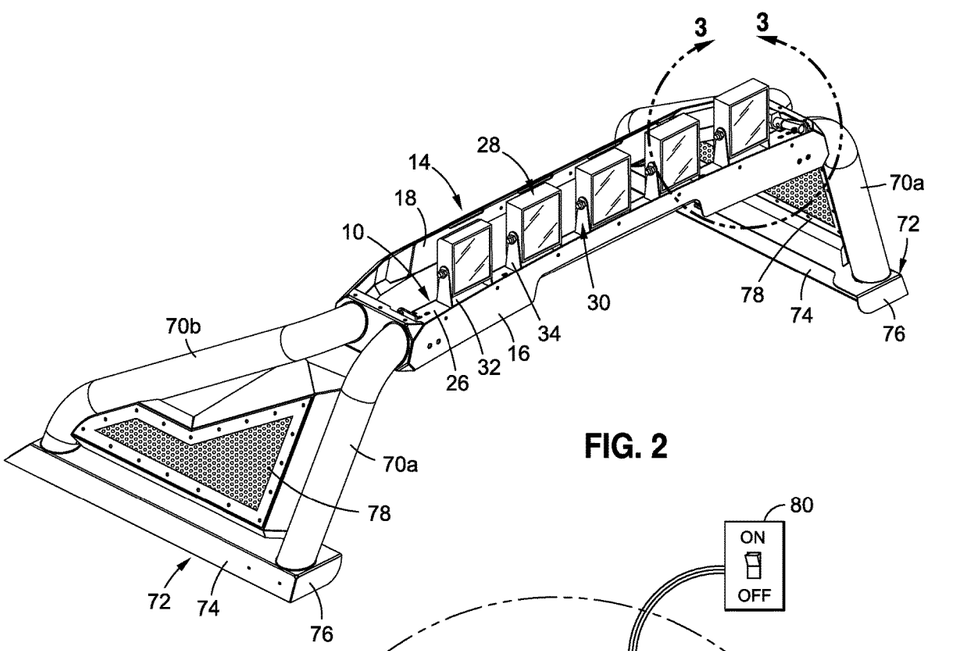
FIG. 2 is a perspective view of the light bar and mounting frame of FIG. 1.
Figure 3:
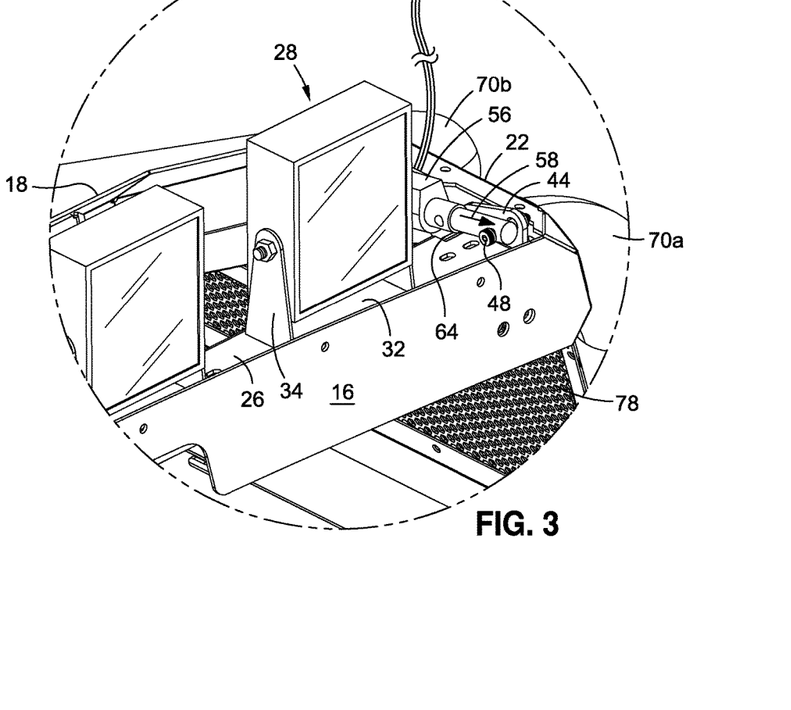
FIG. 3 is an enlarged view taken at of one end of the light bar of FIG. 2, taken at 3-3 of FIG. 2 showing part of a rotational mechanism.
Figure 4:
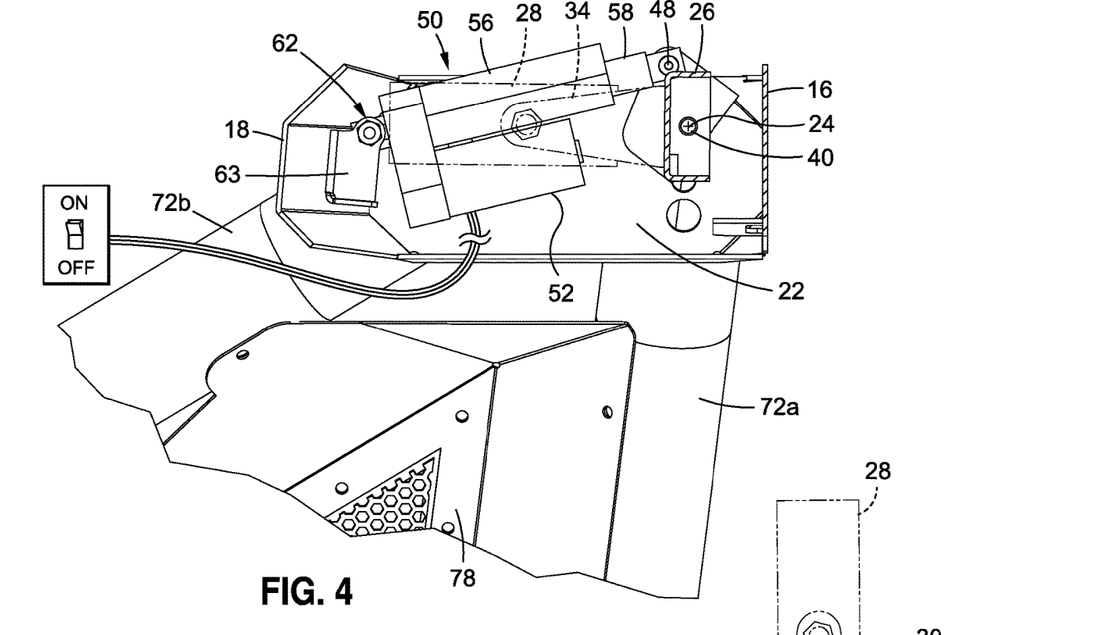
FIG. 4 is a partial sectional view of the rotational mechanism of FIG. 2 showing the light bar in a first, retracted position.
Figure 5:
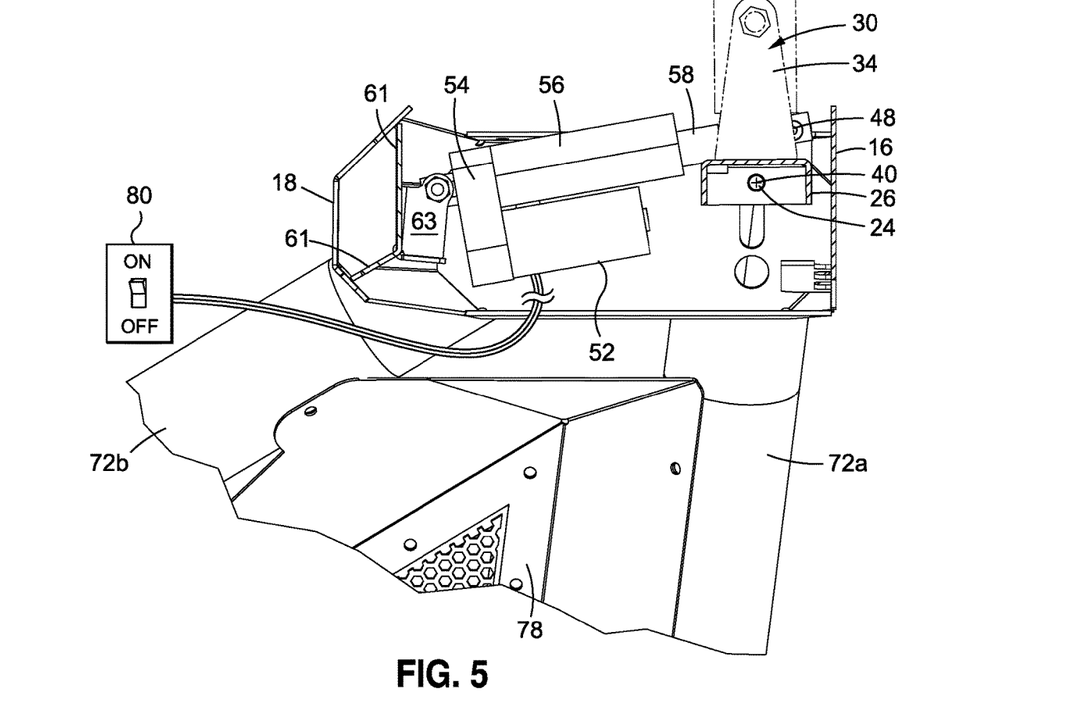
FIG. 5 is a partial sectional view of the rotational mechanism of FIG. 2 showing the light bar in a second, deployed position.

Referring to FIGS. 1-3, a rotatable light bar 10 for a motor vehicle 12 is shown. The sport bar has a generally rectangular support frame 14 with front and rear opposing sidewalls 16, 18, respectively and first and second opposing end walls 20, 22, joined to form a generally rectangular enclosure or housing with an open top. As used herein, the relative directions front and rear, forward and backward, up and down, upper and lower are with respect to a vehicle on which the light bar 10 is mounted with the front of the vehicle being the forward direction and the ground being the down direction. The bottom of the generally rectangular enclosure of the support frame 14 may be open or covered. The sidewalls 16, 18 are preferably metal strips as are the end walls 20, 22, with the parts connected together by welding, rivets, threaded fasteners or other connecting methods to form a generally rectangular shape with the sidewalls 16, 18 generally to each other and the end walls 20, 22 generally to each other. The "generally parallel" refers to the overall structure arrangement because as seen in FIGS. 4 and 5, the rear sidewall 18 is a concave structure facing forward while front sidewall 16 inclines slightly rearward. The sidewalls 16, 18 may have a slight cutout 23 in their lower edge along the center portion of the sidewalls. Among other things, the cutout in order to reduce blockage of air and water at the middle of the sidewalls 16, 18.

As best seen in FIGS. 1 and 2, a longitudinal axis 24 extends between the end walls 20, 22 and an elongated support member 26 extends along and rotates about that axis. At least one, and preferably a plurality of lights 28 are connected to the elongated support member 26 and rotate with the elongated support member 26 without changing their orientation relative to the support member 26 during that rotation. A light mounting bracket, such as U-shaped bracket 30 preferably connects the lights to the elongated support member 26, with the bottom 32 of the U-shaped bracket 30 being fastened to the support member 26 by threaded fasteners (not shown) or other means. Preferably two threaded fasteners are used so the bracket 30 and base 32 may be aligned with the length of the support member 26 and axis 24 in a way that restrains rotation of the bracket relative to the support member 26. The opposing arms 34 of each U-shaped bracket 30 connect to opposing sides of a light 28 to allow the lights 28 to rotate about axis 36 parallel to, but offset from, axis 24. Advantageously all lights 28 rotate about a common axis 36 but need not do so. The arms 34 preferably have threaded nuts (FIG. 3) engage threaded posts (FIG. 3) extending from the side of the light 28 along axis 36 in order to clamp the bracket arm 34 against the light and restrain rotation about an axis parallel to the length of base 32 and axis 24 when the nuts are is loosened and to restrain rotation when the nuts are tightened. The threaded post and nuts provide a clamping mechanism to selectively fix the angle of rotation of the light 28 about a light rotational axis 36 through the connections with the bracket 30. The rotation of the light 28 about axis 36 moves the light's beam up and down, and allows the light direction to be adjusted vertically during use, while tightening of the nuts fixes the relative orientation of the light 28 and its beam relative to the rotating support member 26 and light bracket 30. The lights 28 are preferably adjusted so their beams are generally horizontal or slightly downward toward the ground during use.

The elongated support member 26 is rotatably mounted to rotate about axis 24. The rotatable connection is preferably the same so only one end is described. As best seen in FIG. 1, the elongated support member 26 has a cylindrical post 40 extending along axis 24 from the end of the support member 26, with the post 40 located and sized to pass through a first, mounting hole 42 in a connecting flange 44 which is fastened to the end of the elongated support member 26. The cylindrical post 40 extends through the connecting flange 40 and into a recess or socket 45 (FIG. 1) in each of the end walls 20, 22, with a bushing or bearing in the end wall 22 so the post 40 rotates freely about axis 24. Thus, two posts 40 on opposing ends of the elongated support member 26 are rotatably connected to opposing end walls 20, 22 so the support member 26 may rotate about axis 24, with a connecting flange 42 fixed to each opposing end of the support member 26 and rotating with the support member. Each recess 45 may have a bushing or bearing encircling axis 24 to receive the cylindrical post 45 and facilitate rotation of the elongated support member 26 about axis 24.

At least one and preferably both of the connecting flanges 44 have a second, cam hole 46 through which a pin or threaded fastener 48 passes to connect the flange 44 to an actuation mechanism 50. In the depicted embodiment of FIG. 1 only one actuation mechanism 50 is shown but a mechanism could be located at each end of the support frame 14 and elongated support member 26. The support member 26 thus has one, and preferably a plurality of lights 28 fastened to the support member 26 through light brackets 30 that allow the individual lights to be positioned relative to the support member 26 by rotation along light axis 36. The elongated support member 26 has a connecting flange 44 fastened to at least one end of the member 26 (e.g., welded, riveted or bolted) so as to rotate with the support member 26, with rotation post 40 extending through a hole in that flange 44 (or optionally part of and extending from the surface of flange 44 itself). The flange 44 has an offset connecting cam hole 46 for connection with the actuating mechanism 50 to rotate the support member 26 about the post 40 that extends along rotational axis 24. The post 40 on each end of the support member 26 fits into a mating hole or recess in the end wall 20, 22 so the support member 26 may rotate about posts 40 an axis 24.

Referring to FIGS. 1, 3, 5 and 5, the actuation mechanism 50 may comprise any of a variety of devices arranged to rotate the elongated support member 26 and attached lights 28 about axis 24. Additional actuation mechanisms 50 are discussed below, but for illustration, electric motor 52 may rotate a shaft (not shown) with a transducer 54 such as a gear train modifying the force and motion of the motor shaft to cause an extendable and retractable piston shaft 58 extend and retract relative to a fixed piston base 56. A hole 60 (FIG. 3) through the end of the piston shaft 53 connects the shaft 53 to the connecting flange 44 and elongated support bar. As the piston shaft 53 is connected to the connecting flange 44 at a location offset from the axis 24 which passes through that connecting flange, movement of the piston shaft 53 will rotate the connecting flange and elongated support member 26 which is connected to that flange. The offset between the holes 42, 46 in connecting flange 44 forms an offset cam which causes rotation of elongated support member (and lights 28) about axis 24 as the extendable and retractable piston 58 extends and retracts.

Referring to FIGS. 1 and 4, when the piston 58 is in a first, retracted position the elongated support member 26 (shown in cross-section with a C-shaped cross-section) is in a vertical orientation with the lights 28 held horizontally, extending between the side walls 16, 18 and within the enclosure formed by sidewalls 16, 18 and end walls 20, 22. This is a stowed position with the lights 28 shielded by the side walls and end walls 16, 18, 20, 22 and the top faces of the lights 28 generally within those walls and preferably slightly below or flush with the upper edge of those walls. The faces of the lights can extend above the upper edge of those walls but the further the lights extend the more risk of damage to the lens of the lights.

Figure 6:
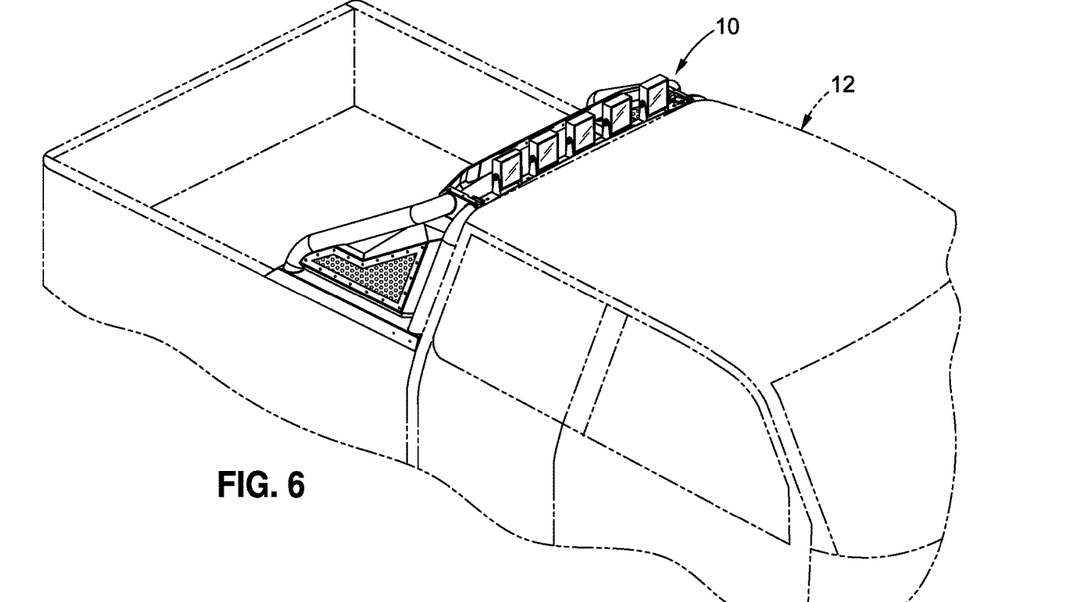
FIG. 6 is a perspective view of a vehicle with the light bar and mounting frame of FIG. 1 on the vehicle and with the lights in a deployed position.
Figure 7:
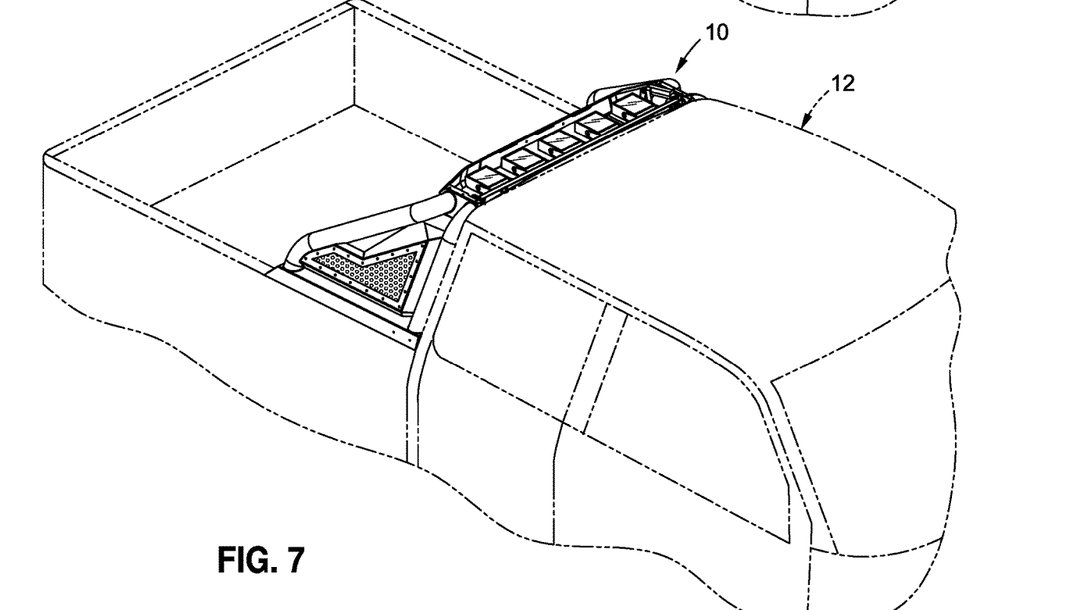
FIG. 7 is a perspective view of a vehicle with the light bar and mounting frame of FIG. 1 on the vehicle and with the lights in a retracted position and generally flush with a top of the vehicle cab.

Referring to FIGS. 1-3 and 5-7, when the piston 58 is in a second, extended position the elongated support member 26 is in a horizontal orientation with the lights 28 held generally vertically and above the upper periphery of the top edge of the walls 16, 18, 20, 22 so as to shine forward and assist the vehicle lights during use (FIG. 6). As seen in FIGS. 4 and 5, the actuating mechanism 50 is preferably pivotally mounted to the sidewall 18 at rotating connection 62 mounted to a brace 63 that offsets the connection 62 from the sidewall 18. That allows a slight rotation as the extendable and retractable piston shaft 58 extends and retracts. The rotating connection 62 is formed by passing the shaft of a threaded fastener through aligned holes through a boss or flange 63 extending from or fastened to the sidewall 18 or brace 61, and a boss extending from or fastened to the actuating mechanism 50. Depending on the arrangement of the parts, a cutout 64 (FIG. 3) may be provided to prevent the piston base 56 or extendable piston shaft 58 from hitting the sidewall 16 or end wall 20, 22.

Advantageously, a single actuating mechanism 50 may be used, located adjacent end wall 22 as shown in FIG. 1. But if desired two or more mechanisms may be used, depending on the weight of the lights 28 and the support to be provided to the support member 26. Advantageously, only two actuating mechanisms 50 are used in order to avoid complexities in synchronizing the mechanisms and rotation of the support member 26 and lights 28.

Referring to FIGS. 1-2, the support frame 12 is connected to mounting frame that preferably including at least one tubular frame member 70 on each end of the support frame. The illustrated embodiment locates the frame 12 at the rear of the cab of a pickup truck and has two tubular, mounting frame members 70 connected to each of the ends 18, 22. A forward mounting frame member 70a extends in the generally vertical direction from a mounting flange 72 that is generally horizontal to a forward side of one of the end walls 20, 22. The mounting frame members 70a are preferably cylindrical tubes but other cross-sectional shapes may be used, including rectangular cross-sections. The upper portions of the front frame members 70a extend in the vertical direction so as to follow the vertical direction of the back of a cab on a pickup truck. The front frame members 70a may be inclined toward each other if the length of the support frame does not extend across the entire width of the vehicle cab. The front frame members 70a are long enough or extend vertically enough to place the bottom of the walls 16, 18, 20 and 22 at the top of the roof of the vehicle so the lights 28 can shine forward across the top of the vehicle's cab as in FIG. 6.

A rear mounting frame member 70b extends from a rear side of one of the end walls 20, 22 to the mounting flange 72, rearward of the connection of the forward member 70 a with the flange 72. The mounting flange 72 may be a flat plate and fastened to a truck box, or as seen in FIGS. 1-2, have a depending side 74 located to fit along the outer side of a pickup bed's sidewall and restrain movement of the mounting flange 72 laterally toward the inside of the truck bed during use. The mounting flange 72 may have a front depending flange 76 to fit between the cab and the truck bed at the front of the truck bed's sidewall, in order to keep the flange 72 from sliding rearward. The space between the two frame members 70a, 70b may be empty or filled with a panel 78 as shown.

The rotation of the elongated support member 26 and lights 28 between the first and second positions was described using an electric motor in the actuating mechanism 50 to move the extendable piston shaft 58. Numerous other mechanisms may be used to extend and retract the piston shaft 58, including a solenoid aligned with the base 56 and extendable piston 58, or an electrically driven pneumatic compressor 58 driving an air piston assembly 56, 58, or a hydraulic compressor 58 driving a hydraulic piston assembly 56, 58. All of these various mechanisms described herein comprise means for rotating the elongated support bar 26 and lights 28.

The size of the driving motor 52 depends in part on the mounting and mass of the support member 26 and lights, and on the offset cam distance between the rotating axis 24 through post 40 and hole 42, and the connection with the movable piston member 58 at cam hole 46 and pin 48. The larger the offset the more distance traveled by the extendable and retractable piston member 58 and the lower the power required of the motor 52. The use of a linearly actuated (via piston 58), offset cam mechanism as describe here allows a predictable rotation so the elongated support member 26 and lights 28 are repeatedly and accurately positioned in the first and second positions, and preferably no other positions. Thus, by varying the length that the piston member 58 extends or retracts the amount of rotation of the support member 26 and lights 28 may be varied. Advantageously, the lights may be deployed and retracted in a few seconds and the actuating mechanism 50 designed accordingly.

Actuation of the actuating mechanism 52 is preferably controlled by a power switch 80 (FIGS. 4-5) that may be located on or adjacent to the walls 16, 18, 20, 22 or members 70a, 70b and in electrical communication with the vehicle's battery or alternator or generator that is used to power the lights 28. Preferably, the power switch 80 is located in the vehicle cab and on the vehicle's dashboard, for easy access by the vehicle driver or passenger and to allow rapid deployment or extraction of the lights 28 as deemed necessary.

When the lights 28 are in the first, retracted position the lights are substantially surrounded by the generally rectangular enclosure formed by sidewalls 16, 18 and end walls 20, 22, so that any branches, undergrowth, rocks or other debris passing the area of the lights will strike and be deflected by the walls 16, 18, 20, 22, and any striking of the lights 28 will be a glancing blow more parallel to the face of the lights and thus less likely to damage the lights. In this first, retracted position the lights are also shielded by the sidewalls 16, 18 from wind generated by vehicle motion and that reduces wind resistance and noise. When the lights 28 are in the first, retracted position they are also generally parallel to the roof of a motor vehicle as in FIG. 7, in the sense that the lenses of the lights or the body of the lights are generally parallel to the vehicle's roof, providing a lower profile that makes the lights less subject to damage and offers less wind resistance and noise. When the lights 28 are in the second, deployed position they are generally perpendicular to the vehicle roof and pointing in the same direction as the vehicle's headlights (FIG. 6), with the rotation of the individual lights about axis 36 allowing some variation in the direction of each light.

The depicted embodiment shows the light bar 10 mounted on two mounting frame members 70a, 70b suitable for locating the light bar at the rear of a pickup truck's cab. If the light bar 10 is mounted toward the front of the cab a single mounting frame member 70a may be used, preferably one with a narrower profile such as a tube with a thin, rectangular cross-section that extends along and may be connected to the frame for the vehicle's windshield or the front quarter panel. Alternatively the front mounting frame member 70a may extend generally vertically downward to fasten to the front quarter panel of the vehicle. Given the present disclosure, one skilled in the art may configure the mounting frame members 70 various ways to position the light bar 14 at various locations on the vehicle to meet the desired lighting needs.

The preferred design has the connecting flange 44 at one end of the support member 26. But a flange with the offset hole 46 could be located anywhere along the length of the support member 26, with an actuating mechanism correspondingly located and connected to one of the sidewalls 16, 18 and connected to the offset hole 46 to form a cam mechanism to rotate the support member 26 and lights 28.

The elongated support member 26 is shown with a C-shaped cross-section that allows the lights 28 to be fastened to the long leg of the cross-section. A series of pre-formed holes may be placed along the length of the support member to make it easy to align the lights 28 or brackets 30 on the member 26 so the lights are aligned relative to the member 26. Depending on the weight of the lights, other cross-sectional shapes can be used, including box sections. The support member 26 is rotatably mounted to rotate about axis 24 within the shielding enclosure formed by the walls 16, 18, 20, 22.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein.

What is claimed is:

1. A light bar and mounting system for a motor vehicle, comprising:
    a first mounting bracket connectable to the motor vehicle during use;
    a second mounting bracket connectable to the motor vehicle during use;
    at least one crossmember having a first end and a second end, the first end connected to the first mounting bracket, and the second end connected to the second mounting bracket, the at least one crossmember extending between the first mounting bracket and the second mounting bracket;
    an elongated support member connected to the at least one crossmember;
    at least one electrical light fastenable to the support member; and
    an actuator connected to the support member, the connection being offset from a rotational axis parallel to the support member to form an offset cam, the actuator rotating the support member and lights about the rotational axis between first and second positions, the first position having the lights oriented generally horizontal during use and the second position having the lights generally perpendicular to the first position.

2. The light bar and mounting system of claim 1, wherein the actuator is a linear actuator.

3. The light bar and mounting system of claim 2, wherein the actuator is a piston.

4. The light bar and mounting system of claim 1, wherein the first mounting bracket and the second mounting bracket each include a mounting plate.

5. The light bar and mounting system of claim 1, wherein the first mounting bracket includes at least one tube extending between the mounting plate and the at least one crossmember, and the second mounting bracket includes at least one tube extending between the mounting plate and the at least one crossmember.

6. The light bar and mounting system of claim 1, wherein the at least one crossmember is forward of the elongated support member.

7. The light bar and mounting system of claim 1, wherein the actuator is electrically powered and actuated by a switch.

8. The light bar and mounting system of claim 5, wherein the first mounting bracket and second mounting bracket include two tubes.

9. A light bar and mounting system for a motor vehicle, comprising:
    a first mounting bracket connectable to the motor vehicle during use;
    a second mounting bracket connectable to the motor vehicle during use;
    at least one crossmember having a first end and a second end, the first end connected to the first mounting bracket, and the second end connected to the second mounting bracket;
    an elongated support member connected to the at least one crossmember;
    at least one electrical light fastenable to the support member; and
    an actuator connected to the support member, the connection being offset from a rotational axis parallel to the support member to form an offset cam, the actuator rotating the support member and lights about the rotational axis between first and second positions.

10. The light bar and mounting system of claim 9, wherein, in the first position the lights are oriented generally horizontal during use and, wherein, in the second position the lights are oriented generally perpendicular to the first position.

11. The light bar and mounting system of claim 9, wherein the at least one crossmember extends between the first mounting bracket and the second mounting bracket.

12. The light bar and mounting system of claim 9, wherein the actuator is a liner actuator.

13. The light bar and mounting system of claim 12, wherein the actuator is a piston.

14. The light bar and mounting system of claim 9, the first mounting bracket and the second mounting bracket each include a mounting plate.

15. The light bar and mounting system of claim 9, wherein the at least one crossmember is forward of the elongated support member.

16. The light bar and mounting system of claim 9, wherein the first mounting bracket includes at least one tube extending between the mounting plate and the at least one crossmember, and the second mounting bracket includes at least one tube extending between the mounting plate and the at least one crossmember.

17. The light bar and mounting system of claim 16, wherein the first mounting bracket and second mounting bracket include two tubes.

18. The light bar and mounting system of claim 9, wherein the actuator is mounted on an end of the elongated support member.

* * * * *